United States Patent [19]

Chen et al.

[11] Patent Number: 5,262,237
[45] Date of Patent: Nov. 16, 1993

[54] RUBBER-BASED PRIMER FOR ROOM TEMPERATURE REPAIR OF RUBBER GASKETS

[75] Inventors: Chia-Hung Chen, Dublin, Ohio; Jeffrey T. Fields, Willimantic, Conn.

[73] Assignee: Ashland Oil, Inc., Ashland, Ky.

[21] Appl. No.: 694,672

[22] Filed: May 2, 1991

[51] Int. Cl.⁵ ............................................. B32B 23/00
[52] U.S. Cl. .................................. 427/393.5; 524/483
[58] Field of Search ...................... 524/483; 427/393.5

[56] References Cited

U.S. PATENT DOCUMENTS 4,197,227  4/1980  Zeliger .................................. 524/483

Primary Examiner—Joseph L. Schofer
Assistant Examiner—Peter D. Mulcahy
Attorney, Agent, or Firm—Mueller and Smith

[57] ABSTRACT

The present invention is directed to a primer for application to a rubber gasket for its subsequent repair by a room temperature-curable elastomer. The primer comprises masticated rubber, liquid natural rubber, and carbon black dispersed in a solvent therefor. The method for preparing the rubber gasket surface for repair by a room-temperature-curable elastomer by priming the surface with the inventive primer forms another aspect of the present invention. The rubber gasket which has been primed with the inventive primer forms a further aspect of the present invention.

4 Claims, No Drawings

RUBBER-BASED PRIMER FOR ROOM TEMPERATURE REPAIR OF RUBBER GASKETS

BACKGROUND OF THE INVENTION

The present invention relates to marine gasket maintenance and more particularly to their room temperature repair.

Marine bulkhead doors and hatches necessarily must maintain a water-tight seal when they are closed. Typically, a water-tight seal is obtained by an elastomeric (usually rubber-based) gasket which the outer periphery of the door or hatch presses against when dogs or other closure mechanism latches the door or hatch closed. The water-tight (and sometimes air-tight) seal relies on the elasticity of the gasket conforming to the door or hatch that is in contact therewith. Over time, however, the gasket can become permanently grooved. When this happens, the seal is difficult to maintain.

Heretofore, the gaskets required replacing when their sealing effectiveness was compromised. It will be observed that sterilizers and other pressurized vessels similarly function utilizing sealing gaskets which mate with doors. The same lack of sealing integrity of the sealing gasket befalls such sterilizer gaskets also. If the gaskets could be repaired in place, their longevity would be improved as would the economics since only torn or eroded areas would need to be repaired.

BROAD STATEMENT OF THE INVENTION

The present invention is directed to a primer for application to a rubber gasket for its subsequent repair by a room temperature-curable elastomer. The primer comprises masticated rubber, liquid natural rubber, and carbon black dispersed in a solvent therefor. The method for preparing the rubber gasket surface for repair by a room-temperature-curable elastomer by priming the surface with the inventive primer forms yet another aspect of the present invention. The rubber gasket which has been primed with the inventive primer forms yet another aspect of the present invention.

Advantages of the present invention include an expeditious means for repairing damaged rubber gaskets. Another advantage is the ability to reduce maintenance costs by only having to repair the damaged areas and leave the undamaged areas intact for use. These and other advantages will be readily apparent to those skilled in the art.

DETAILED DESCRIPTION OF THE INVENTION

The primer that is applied to the prepared surface of the damaged gasket has four primary ingredients, with a variety of additives being possible. Referring initially to the rubber component, natural rubber is the preferred rubber of choice, though a variety of synthetic rubbers, or combinations thereof, could be used as is necessary, desirable, or convenient. Because of the difficulty in solubilizing rubber, the rubber component is milled or subjected to reduction (masticated) to break down the chain length so that it can be dispersed in a solvent therefor.

Aside from natural rubber, synthetic rubbers include, for example, chlorinated rubber, cyclized rubber, nitrile rubber, butyl rubber, EPDM (ethylene propylene diene monomer) rubbers, and a variety of polybutadiene rubbers. Examples of commercially-available rubbers include, for example, Neoprene, poly(chloroprene); Viton rubber, copolymer of vinylidene fluoride and hexafluoropropylene; Hypalon, polyethylene treated with chlorine and sulfur dioxide to form a chlorosulfonated polyethylene; and Thiokol rubbers, for example a copolymer of sulfur dioxide and vinyl sulfone derivatives. Again, the rubbers are subjected to molecular weight chain break-down (reduction) so that they are suitable for their dispersal in a solvent.

The second ingredient in the inventive primer comprises carbon black. The proportion of carbon black generally ranges from about 5 to 40 phr (weight parts per 100 weight parts of rubber component). As a well-known article of commerce, little more need be said about the carbon black component.

The third ingredient in the inventive primer comprises liquid natural rubber. Chemically, this ingredient is cis-1,4-polyisoprene of low molecular weight. This ingredient is made by depolymerizing natural rubber to a low molecular weight, e.g. around 80,000, liquid.

The solvent for dispersing the masticated rubber and carbon black typically will be a chlorinated organic solvent (e.g. 1,1,1-trichloroethane) though other solvents may be used. Representative solvents include, for example, halogenated (e.g. chlorinated) hydrocarbons, aliphatics (e.g. hexane or heptane), aromatics (e.g. toluene), and the like and mixtures thereof.

The masticated rubber liquid natural rubber, and carbon black components typically are at a maximum of about 20 wt-% on a non-volatile solids content basis in order to maintain adequate application viscosity with lower solids contents being preferred for ease of application.

A variety of additives can be included in the primer, though such additives preferably should not be thixotropic in nature due to the high viscosities encountered in using masticated rubber in the primer composition. Optional ingredients include, for example, silane agents, flow control agents, anti-sag agents, anti-oxidants, tackifiers, fillers, and the like, and mixtures thereof.

In practicing the present invention, the damaged rubber gasket should be sanded and cleaned in order to present a clean surface for priming with the inventive primer. The primer then preferably is brush applied to the area to be repaired and is permitted to air dry. Multiple coatings can be used at the expense of the use of extra primer.

Thereafter, a room-temperature curable elastomer is used to repair the surface. In this regard, conventional two-part room temperature-curable elastomers typically have been liquid-applied sealants which are viscous and sticky during application. Examples of such sealants include, for example, polyurethane sealants, polysulfide sealants, and silicone sealants. Again, unsaturated elastomers such as, for example, natural rubber, chloroprene, EPDM, butyl rubber, nitrile rubber, or the like are known in the art to be vulcanized or cured with sulfur/accelerator combinations. The sticky behavior of these materials makes the manufacturing and application messy, and often requires large amounts of solvent for clean-up. Thus, use of a particular non-sticky commercial two-part, room-temperature curable elastomer for repair of the primed gasket is preferred. Room temperature cure is possible. This preferred commercial sealant (see the Example) is a rubber-based product that is provided in two packs wherein the necessary curatives for the rubber material all are not provided in the same pack. Mixing of the ingredients in an extrudertype mixer, where the material comes out in rope-shape form, provides a non-sticky, easily shaped paste that is ideally suited for sealing or gasket application. After allowing to cure at room temperature ranging from about 1 to 3 days, the material develops into a tough, elastomeric solid and is observed to adhere to the rubber gasket, especially one which has been primed with the inventive primer. Because of the non-sticky characteristic of the extruded material, no messy clean-up is experienced by the applicators.

With respect to other sealants, those skilled in the rubber art will be well versed in activators and accelerators which can be provided and combined with the rubber-based material to make sealant for application to the damaged gaskets [e.g. see Solomon, *The Chemistry of Organic Film Formers*, Chapter 12, Robert E. Krieger Publishing Co., Inc. (1977)], the disclosure of which is expressly incorporated herein by reference.

The following example shows how the present invention has been practiced, but should not be construed as limiting. In this application, all percentages and proportions are by weight and all units are in the metric system, unless otherwise expressly indicated. Also, all references are expressly incorporated herein by reference.

EXAMPLE

The following tabulated ingredients formed the inventive primer:

TABLE 1

| Ingredient | PHR* | Wt % |
|---|---|---|
| Natural Rubber | 100 | 9.2 |
| Carbon Black | 50.0 | 4.6 |
| Liquid Natural Rubber | 12.0 | 1.1 |
| 1,1,1-trichloroethane | 925.0 | 85.1 |

*Weight parts per 100 weight parts of natural rubber.

These ingredients were mixed in a Brabender mixer for 40 minutes in accordance with the following schedule. The initial temperature was 27° C. with the rubber in the blender. After five minutes, the carbon black was added and the temperature increased to 60° C. At about the 20-25 minute time period, the temperature had increased to 103°-106° C. After 30 minutes of mixing, the liquid natural rubber was added. At 35 minutes of mixing, 50 PHR of trichloroethane solvent was added. After 40 minutes of mixing, the temperature had decreased to 62° C. and the mixing was ceased. The balance of the trichloroethane solvent then was added to produce a primer that was brushable and ready to use.

The primer was applied to the surface of unprimed gaskets at room temperature and permitted to dry for 10-20 minutes. Thereafter, two different sealants were applied to the primed surface and permitted to cure for 6 days. The adhesion of the sealant to the unprimed and primed gaskets was tested with the following results.

TABLE 2

| Sealant* | Primer | Peel Strength (lb/in. width) | Substrate Failure (% CF)** |
|---|---|---|---|
| A | Primed | 17.2 | 100 |
|   | Unprimed | 10.4 | 87 |
| B | Primed | 14.0 | 100 |
|   | Unprimed | 6.1 | 50 |

*Amerbond ™ gasket repair system, a room temperature-curable rubber-based two-pack sealant. Part A is black in color, Ford Cup viscosity of 17-22 g/4 min. (50 psi, 8 mm diameter opening), 65-75% non-volatile solids; Part B is light yellow in color. Ford Cup viscosity of 7-12 g/4 min. 65-75% non-volatile solids; weight mix ratio of 1:1 for Parts A and B; Drew Marine Division Ashland Chemical, Inc., Boonton, N.J.
**CF is cohesive failure of repaired gasket.

The above-tabulated results demonstrate that the primer has improved the adhesion significantly between the two-part room temperature curable sealant and the damaged gasket.

We claim:

1. A method for preparing the surface of a rubber gasket for its subsequent repair by a room temperature-curable elastomer, which comprises applying to said surface to be repaired a primer comprising masticated rubber, liquid natural rubber, and carbon black dispersed in a solvent for said masticated rubber and subsequently applying a room temperature curable elastomer.

2. The method of claim 1 wherein said primer comprises between about 5 and 40 weight parts of said carbon black per 100 weight parts of said masticated rubber.

3. The method of claim 1 wherein said solvent is selected from the group consisting of halogenated hydrocarbons, aliphatic solvents, aromatic solvents, and mixtures thereof.

4. The method of claim 1 wherein said primer comprises between about 1 and 10 weight parts of said liquid natural rubber per 100 weight parts of said masticated rubber.

* * * * *